US012570411B2

(12) United States Patent
Plebuch et al.

(10) Patent No.: US 12,570,411 B2
(45) Date of Patent: Mar. 10, 2026

(54) SEAT SYSTEM AND CABIN AREA FOR USE IN A CREW ESCAPE SYSTEM OF A SPACE TRANSPORT VEHICLE

(71) Applicants: ArianeGroup GmbH, Taufkirchen (DE); ArianeGroup SAS, Les Mureaux (FR)

(72) Inventors: Alex Plebuch, Munich (DE); Marco Prampolini, Chambourcy (FR); Marco Wolf, Weyhe (DE)

(73) Assignee: ARIANEGROUP GMBH, Taufkirchen (DE)

( * ) Notice: Subject to any disclaimer, the term of this patent is extended or adjusted under 35 U.S.C. 154(b) by 167 days.

(21) Appl. No.: 18/351,820

(22) Filed: Jul. 13, 2023

(65) Prior Publication Data

US 2024/0017853 A1 Jan. 18, 2024

(30) Foreign Application Priority Data

Jul. 13, 2022 (EP) ..................................... 22315145

(51) Int. Cl.
*B64G 1/52* (2006.01)
*B60N 2/30* (2006.01)

(52) U.S. Cl.
CPC ........... *B64G 1/525* (2023.08); *B60N 2/3013* (2013.01)

(58) Field of Classification Search
CPC . B64G 1/60; B64G 1/52; B64D 25/12; B64D 25/04; B60N 2002/022
See application file for complete search history.

(56) References Cited

U.S. PATENT DOCUMENTS 4,301,983 A * 11/1981 Horan .................... B64D 25/02
296/68.1
5,297,761 A 3/1994 Kendall, Jr. et al.
(Continued)

FOREIGN PATENT DOCUMENTS

FR 2 916 184 A1 11/2008
JP 2010-526719 A 8/2010
(Continued)

OTHER PUBLICATIONS

European Patent Office, Communication pursuant to Article 94(3) EPC issued in European Patent Application No. 22 315 145.7 (May 10, 2024).

(Continued)

*Primary Examiner* — Timothy D Collins
*Assistant Examiner* — Eric Acosta
(74) *Attorney, Agent, or Firm* — Leydig, Voit & Mayer, Ltd.

(57) ABSTRACT

A seat system for use in a crew escape system of a space transport vehicle comprises a seat having a backrest with a supporting surface. The seat is configured to be installed in a cabin area of the crew escape system so it can rotate about a first axis between a first position where the seat faces a first direction, and a second position where faces a second direction that is opposed to the first direction. The seat system further comprises a control unit configured to control a rotation of the seat at least between the first position and the second position in dependence on at least one signal which is indicative of a trajectory of the crew escape system.

6 Claims, 14 Drawing Sheets

(56) References Cited

U.S. PATENT DOCUMENTS

| | | | | |
|---|---|---|---|---|
| 5,707,103 | A * | 1/1998 | Balk ................... | B60N 2/3052 |
| | | | | 297/378.12 |
| 8,360,368 | B2 | 1/2013 | Bertrand et al. | |
| 2010/0051751 | A1 * | 3/2010 | Mueller ................. | B64G 1/14 |
| | | | | 244/158.9 |
| 2010/0308175 | A1 * | 12/2010 | Bertrand ........... | B64D 11/0639 |
| | | | | 244/171.9 |
| 2015/0253813 | A1 * | 9/2015 | Morrow .............. | F16M 13/022 |
| | | | | 248/229.1 |
| 2018/0208334 | A1 * | 7/2018 | McCarley ............... | B64G 1/62 |
| 2021/0221260 | A1 * | 7/2021 | Hong .................. | B60N 2/1685 |

FOREIGN PATENT DOCUMENTS

| | | | |
|---|---|---|---|
| WO | WO 2005/108150 | A1 | 11/2005 |
| WO | WO 2006/124674 | A2 | 11/2006 |

OTHER PUBLICATIONS

European Patent Office, Extended European Search Report in European Patent Application No. 22315145.7, 5 pp. (Feb. 13, 2023).
Canadian Intellectual Property Office, Examiner's Requisition mailed in Canadian Patent Application No. 3,204,166 (Feb. 12, 2025).

* cited by examiner

1

SEAT SYSTEM AND CABIN AREA FOR USE IN A CREW ESCAPE SYSTEM OF A SPACE TRANSPORT VEHICLE

CROSS-REFERENCE TO RELATED APPLICATIONS

The instant application claims priority to European Patent Application No. 22315145.7, filed Jul. 13, 2022, which is incorporated herein in its entirety by reference.

FIELD OF THE DISCLOSURE

The present disclosure generally relates to a seat system and a cabin area for use in a crew escape system of a space transport vehicle, and to a method of operating such a seat system.

BACKGROUND OF THE INVENTION

Modern space transport vehicles are equipped with a crew escape system which, in a launch abort scenario, serves to evacuate the crew from a fire ball explosion resulting from a launcher failure. The crew escape system can be separated from the launch vehicle in case of an emergency requiring the abort of the launch and typically comprises a capsule shaped crew module which accommodates a cabin for the crew members and an engine for driving the crew module. The human body is most tolerant to a loading scenario, wherein the main loads are directed from the chest to the back. Therefore, a desired loading scenario for the crew members in the crew module of the crew escape system involves a seating position facing the main load vector. Further, during descending of the crew module after a launch abort, but also during a normal landing operation of the crew module, an aft heat shield of the capsule shaped crew module needs to be positioned in front with respect to the trajectory of the crew module. Therefore, known crew escape systems are equipped with suitable systems for controlling the orientation of the crew escape system along the trajectory of the crew escape system and in particular for performing a flip maneuver or alterative maneuvers to provide a correct flight orientation of the crew module after separation from the launch vehicle, but before entering the descending phase.

BRIEF SUMMARY OF THE INVENTION

The present disclosure is directed to a seat system and a cabin area for use in a crew escape system of a space transport vehicle, which assist in a safe and reliable operation of the crew escape system in a launch abort scenario. Further, the disclosure is directed to the object to provide a method of operating such a seat system.

A seat system for use in a crew escape system of space transport vehicle comprises a seat having a backrest with a supporting surface which, when the seat is used by a crew member, is suitable to support an upper body of the crew member. The term "supporting surface" in the context of the present disclosure thus designates a surface of the backrest against which a crew member may lean his/her back when using, i.e., when sitting on the seat. Consequently, at least during regular use of the seat, the orientation of the supporting surface of the backrest substantially defines the orientation of the crew member's upper body. The backrest may also comprise a rear face which faces away from the supporting surface, and which defines a backside of the backrest.

The seat is configured to be installed in a cabin area of the crew escape system so as to be rotatable about a first axis at least between a first position and a second position. When seat is arranged in its first position, the supporting surface of the backrest faces a first direction. When, however, the seat is arranged in its second position, the supporting surface of the backrest faces a second direction. The second direction is opposed to the first direction. In other words, the seat is rotatable about the first axis between the first position and the second position by at least 180°. The rotation of the seat may, however, not be limited to a rotation about the first axis by 180°. Instead, it is also conceivable that the seat is rotatable about the first axis by up to 360° or by any desired angle between 180° and 360°.

The first axis may be an axis which extends through the bottom and the head of a person sitting on the seat in a classical pilot's position. In other words, the first axis may extend substantially parallel to the backrest of the seat and substantially perpendicular to a seat element of the seat, which, when being arranged in a "normal" use position, preferably extends substantially perpendicular to the backrest of the seat.

At least a portion of the supporting surface may extend substantially perpendicular to the first and the second direction. It is, however, also conceivable that the supporting surface or at least a portion thereof is inclined by up to 20°, by up to 15° or by up to 10° with respect to a plane extending perpendicular to the first and the second direction. It is further conceivable that the supporting surface is not flat, but at least in portions thereof slightly curved so as to provide for an increased safety and comfort of the crew member using the seat.

Further, the seat system comprises a control unit which, during operation of the crew escape system, in particular, after the crew escape system has been separated from the space transport vehicle, is configured to control a rotation of the seat at least between the first position and the second position in dependence on at least one signal which is indicative of a trajectory of the crew escape system. The control unit may be a control unit which is exclusively designed to control the rotation of the seat. It is, however, also conceivable that the control unit is or constitutes a part of a superior control system of the crew escape system. Further, the control unit may be configured to receive and process a plurality of (different) signals indicative of the trajectory and other functions and conditions of the crew escape system. For example, the control unit may be configured to receive signals indicative of the altitude and/or the acceleration of the crew escape system. These signals may, for example, be provided by an altitude sensor or an inertial measurement unit (IMU).

BRIEF DESCRIPTION OF THE SEVERAL VIEWS OF THE DRAWING(S)

FIG. 3 shows the cabin area according to FIGS. 2a to 2d with the seats being arranged in a second position, in accordance with the disclosure.

DETAILED DESCRIPTION OF THE INVENTION

Figure 1:
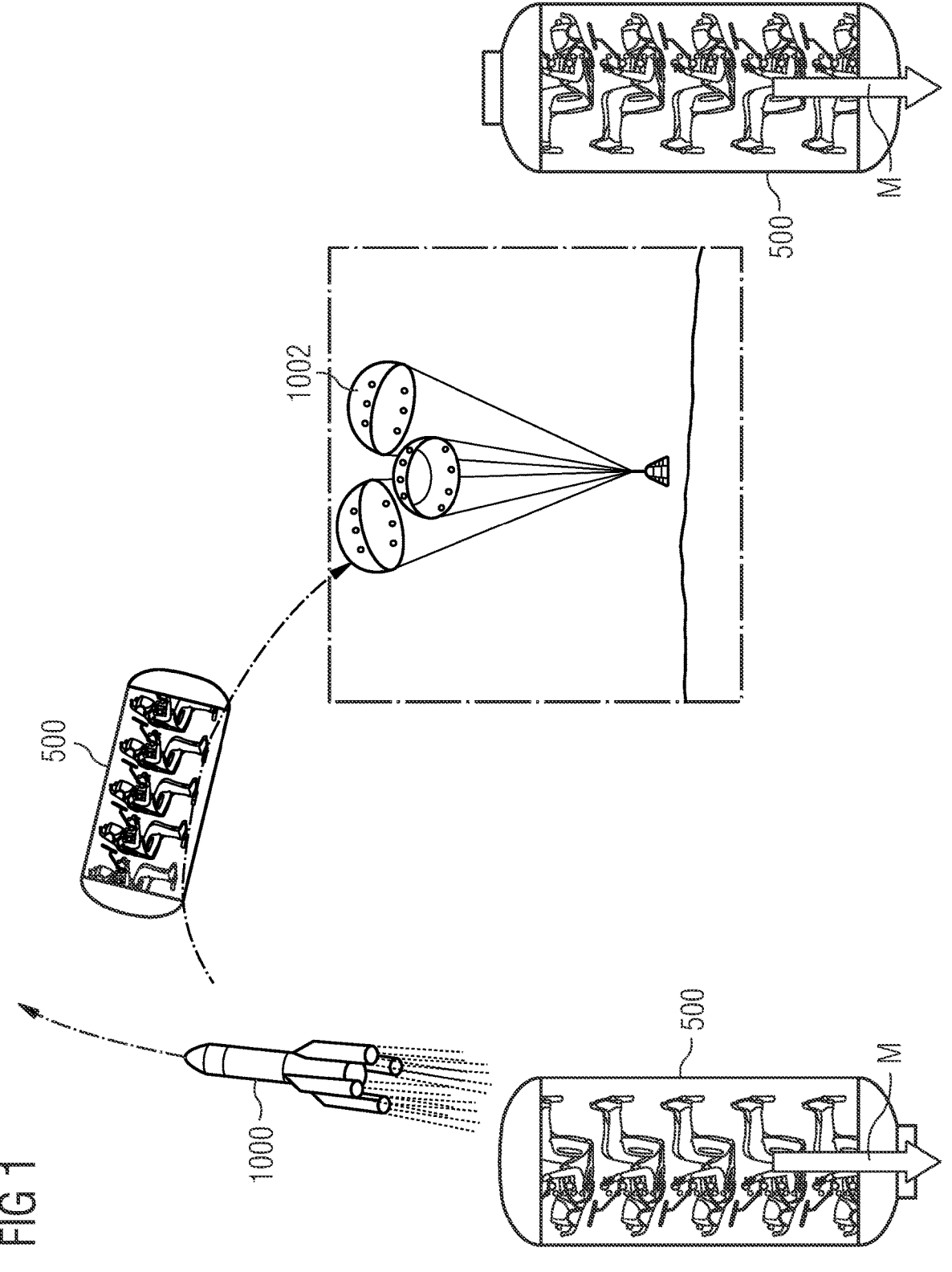
FIG. 1 illustrates flight phases of a space transport vehicle and a crew escape system, respectively, in a launch abort scenario, in accordance with the disclosure.
Figure 2A:
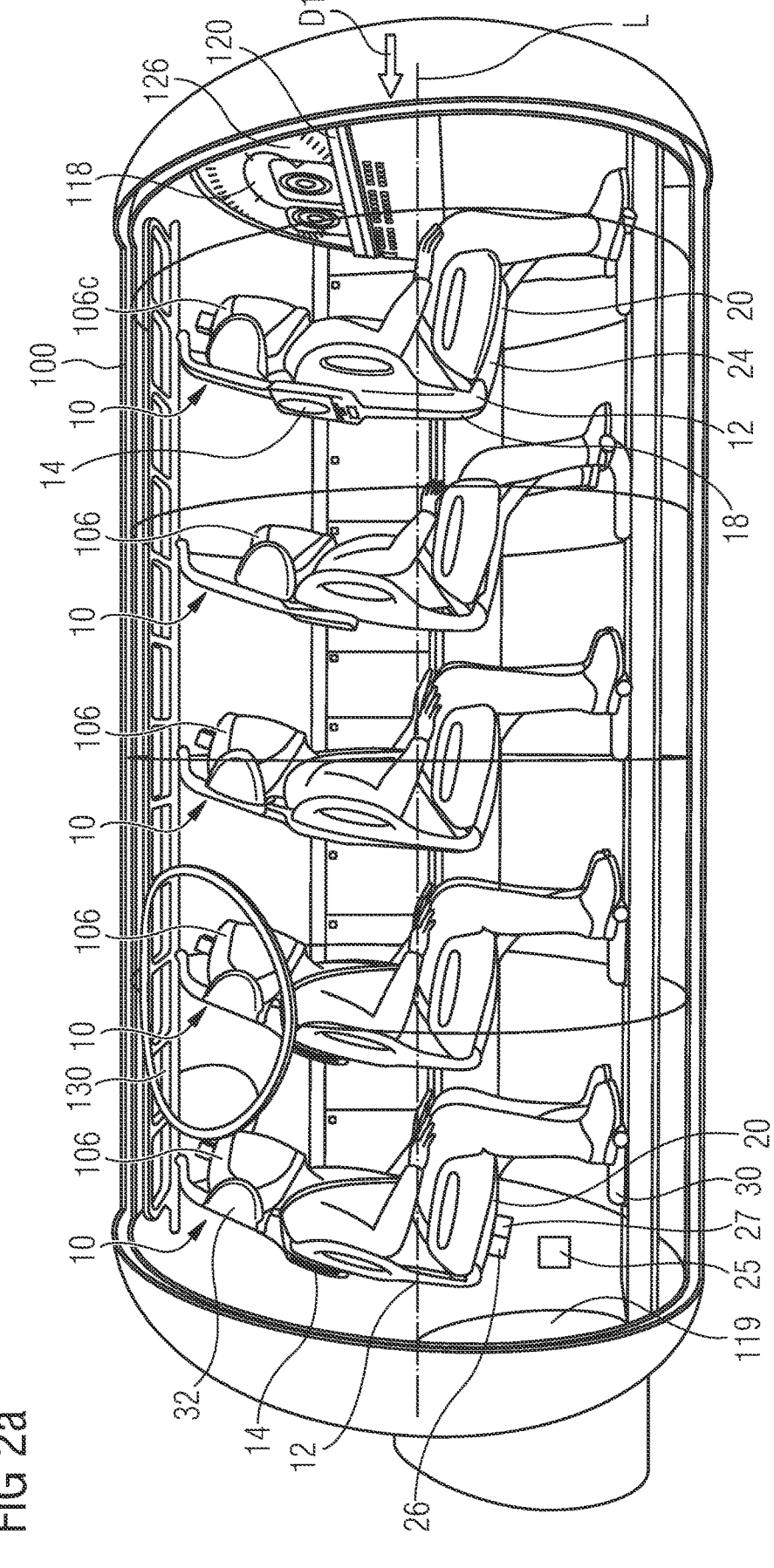
FIGS. 2a to 2d show a cabin area of a crew escape system with seats being arranged in a first position, in accordance with the disclosure.
Figure 2B:
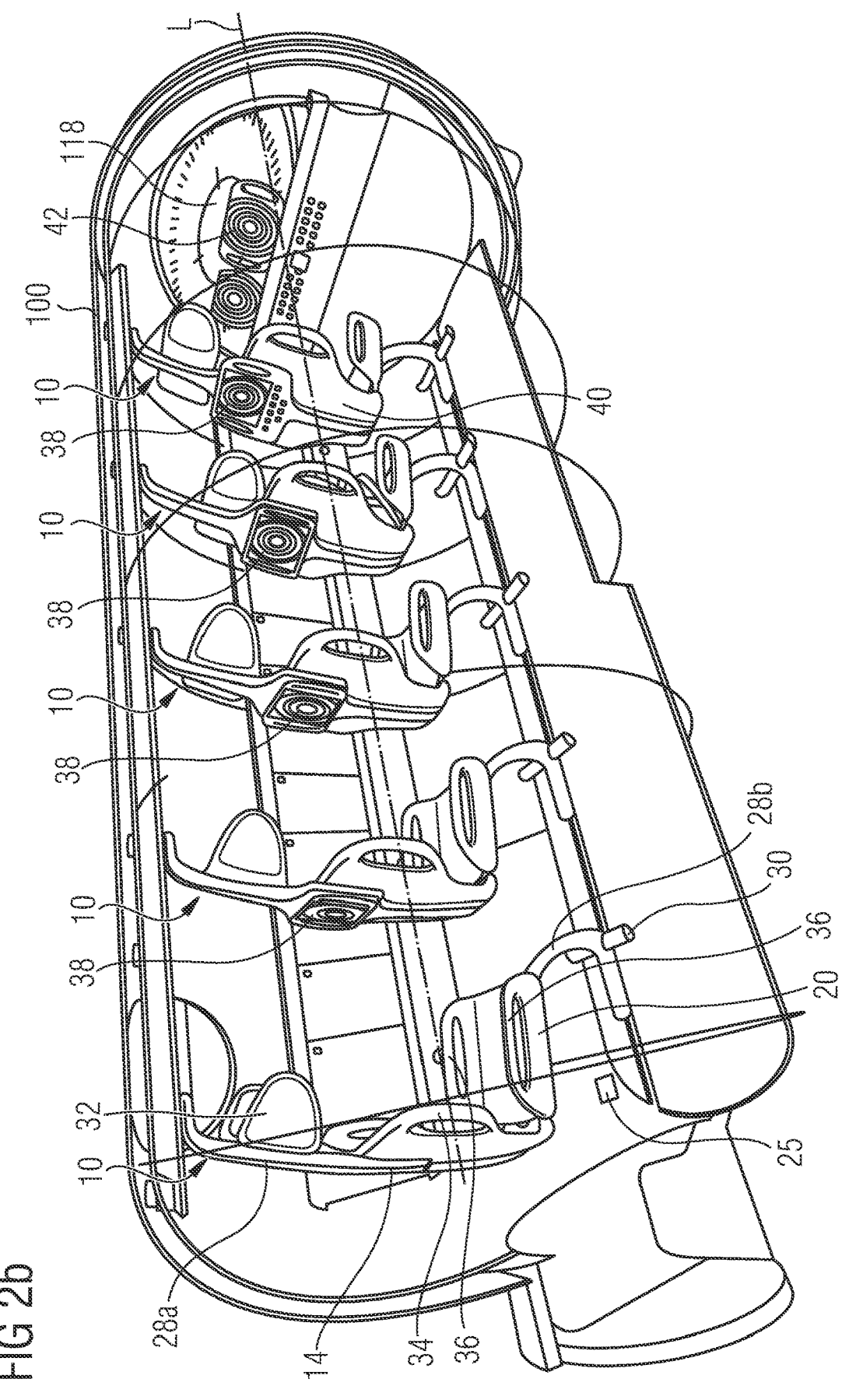
Figure 2C:
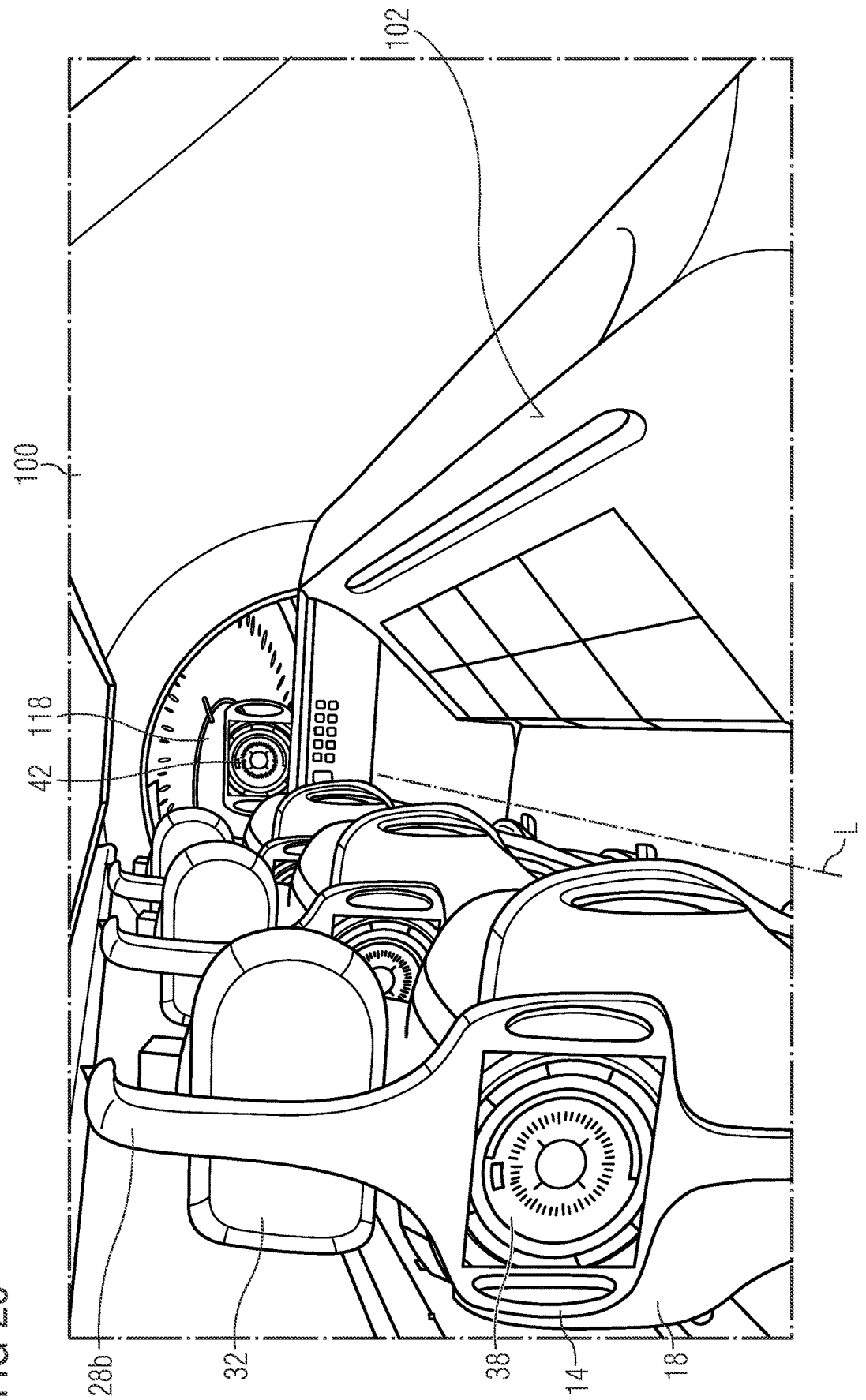
Figure 2D:
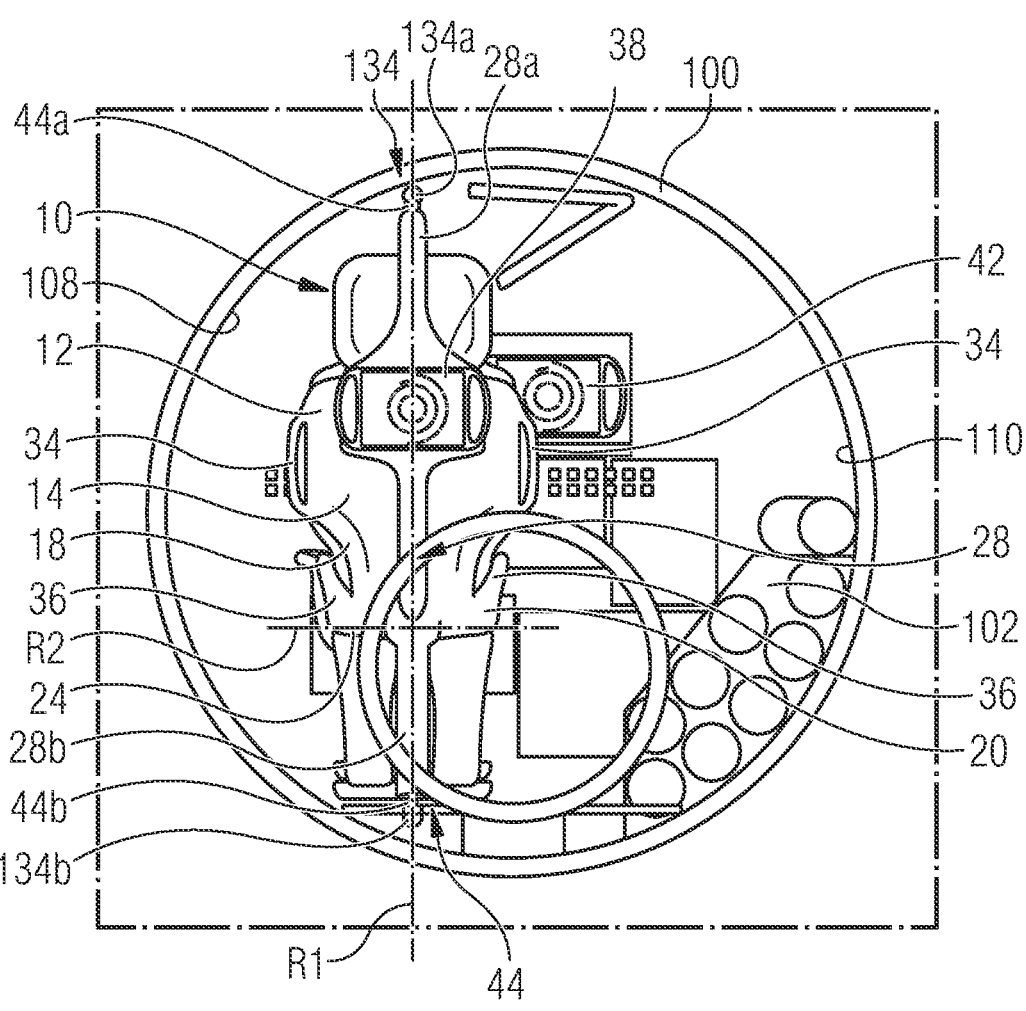

FIG. 1 illustrates the flight phases of a space transport vehicle 1000 and a crew escape system 500, respectively, in a launch abort scenario. During launch of the space transport vehicle 1000, i.e., before the launch abort, the crew escape system 500 (shown in enlarged form in FIG. 1) is arranged in a nose region of the space transport vehicle 1000. In case of an emergency which requires a launch abort, the crew escape system 500 is separated from the space transport vehicle 1000 and returns to earth using parachute systems 1002 for decelerating the travelling speed before touchdown. As shown in FIG. 1, the crew escape system 500, after separation from the space transport vehicle 1000, along its entire trajectory, follows a natural orientation given by its aerodynamic configuration. In particular, the crew escape system 500 exhibits a flight behavior which is comparable to the flight behavior of a shuttlecock, and which involves that a nose of the crew escape system 500, with respect to the direction of movement, is always oriented in front. Thus, unlike than known crew escape systems, the crew escape system 500 of the present disclosure does not perform a flip maneuver for reorienting the crew escape system 500 before landing.

The crew escape system 500 is equipped with a cabin area 100 which is depicted in greater detail in FIGS. 2 to 9. The cabin area 100 is substantially bullet-shaped. Further, the cabin area 100 has a substantially constant, circular cross-section along at least 80% of its extension along its central longitudinal axis L.

In the cabin area 100 at least one seat system 10 is provided. In the exemplary embodiment of a cabin area 100 shown in the drawings, the cabin area 100 comprises a plurality of seat systems 10, five seat systems 10, which are arranged along a central longitudinal axis L of the cabin area 100 one behind another. Specifically, the seat systems 10 are arranged offset relative to the central longitudinal axis L of the cabin area 100, such that the cabin area 100 provides enough installation space for a storage module 102 which, with respect to the central longitudinal axis L of the cabin area 100, is arranged lateral to, i.e. beside the one seat systems 10 (see in particular FIGS. 2c and 2d). The storage module 102 may, for example, accommodate items of freight and/or equipment of the crew escape system 500 such as, for example electronic components or components of other systems of the crew escape system 500.

Figures 7A, 7B, 7C:
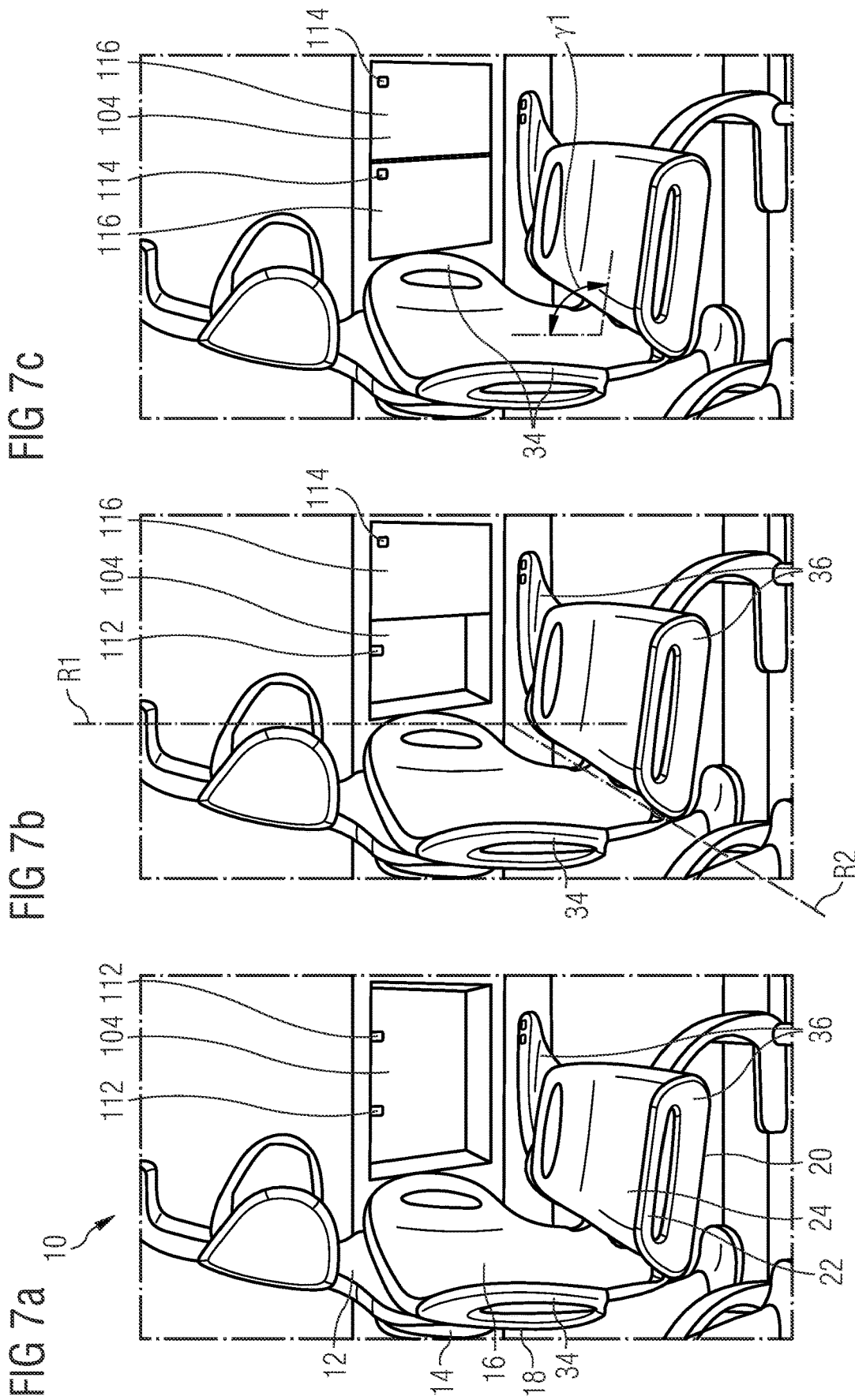
FIGS. 7a to 7c illustrate a storage space provided in the cabin area according to FIGS. 2a to 2d, in accordance with the disclosure.

In the cabin area 100, an associated storage space 104 is provided for each of the seat systems 10 (see FIGS. 7a to c). The storage spaces 104 may, for example, be used for storing personal items of crew members 106 on board the crew escape system 500. With respect to the central longitudinal axis L of the cabin area 100, the storage spaces 104 are arranged lateral to the seat systems. In particular, the storage module 102 and the storage spaces 104 are arranged on opposite sides of the seat systems 10, i.e., the storage spaces 104 are be provided in a first side wall region 108 of the cabin area 100 which is arranged adjacent to the seat systems 10 and opposed to a second side wall region 110 being arranged adjacent to the storage module 102.

Each storage space 104 is provided with at least one attachment system 112 which is configured to interact with a complementary attachment system 114 of a standardized piece of luggage 116 so as to allow an automatic latching of the standardized piece of luggage 116 or another personal item, e.g., a bottle or the like, in the storage space 104. The standardized piece of luggage 116 may, for example, be a backpack or a trolley (see FIGS. 7b and c as well as FIGS. 9a and b). In the exemplary embodiment of a cabin area 100 shown in the drawings each of the storage spaces 104 has two compartments each of which being configured to receive a standardized piece of luggage 116. FIG. 7a depicts an empty storage space 104, FIG. 7b shows a storage space 104 which accommodates a single standardized piece of luggage 116 in one compartment and thus still has one empty compartment, and FIG. 7c shows a storage space 104 which is loaded with two standardized pieces of luggage 160.

The cabin area 100 further comprises a control panel 118. The control panel 118 is arranged in a nose region of the cabin area 100, which, with respect to the direction of movement, is oriented in front when the crew escape system 500 along its trajectory follows a natural orientation given by its aerodynamic configuration as described above. In its tail region, the cabin area 100 is provided with an observation window 119. The control panel 118 may be arranged immediately adjacent to a seat system 10 intended to be used by a commander 106c, whereas the seat systems 10 intended to be used by further crew members 106 are be arranged at a greater distance from the control panel 118, i.e., when viewed along the central longitudinal axis L of the cabin area 100, behind the seat system 10 intended to be used by the commander 106c.

Figure 8:
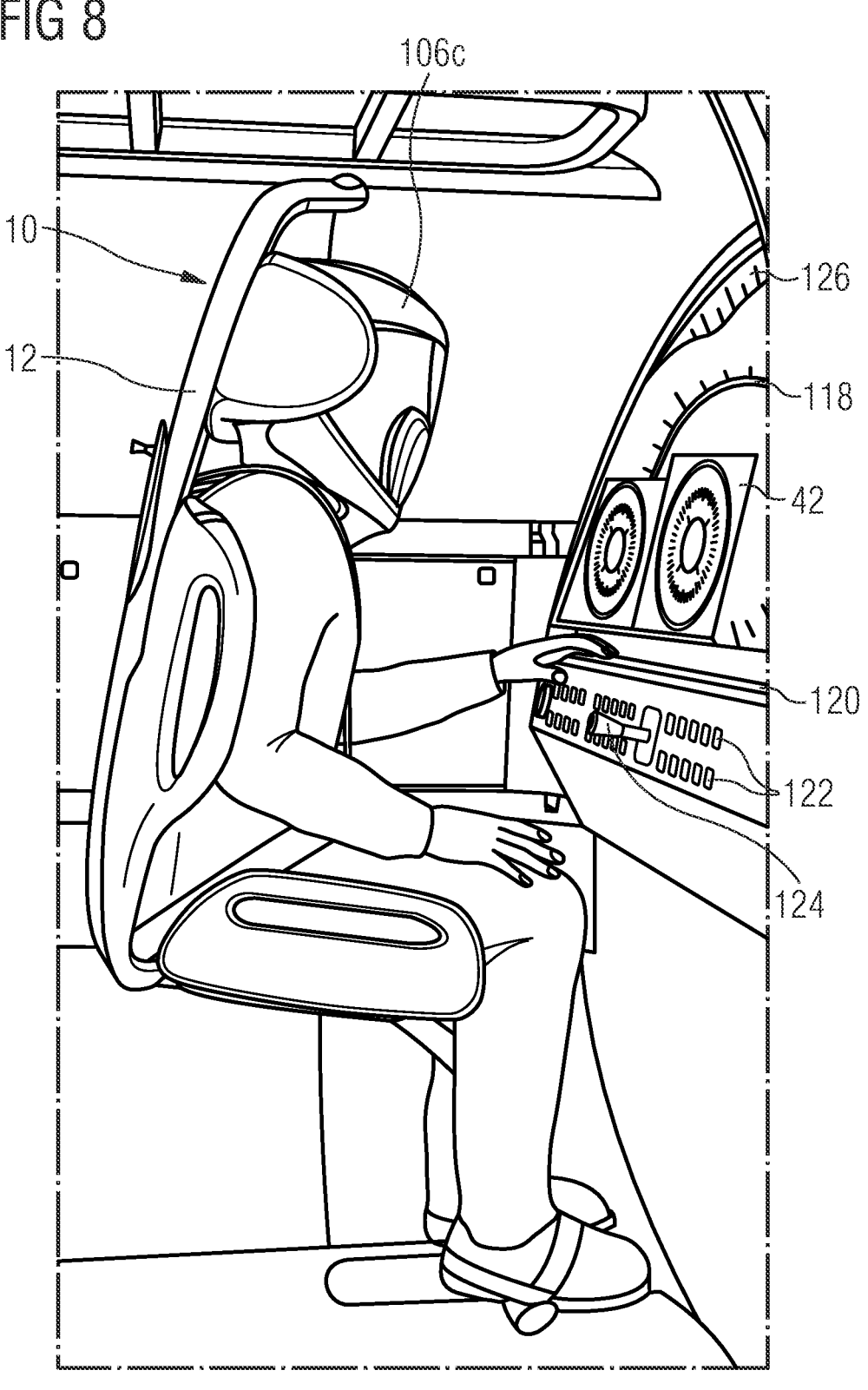
FIG. 8 illustrates a control panel provided in the cabin area according to FIGS. 2a to 2d, in accordance with the disclosure.

The control panel 118 is provided with a grip rail 120 which is arranged above a plurality of control elements 122, 124 of the control panel 118 to support a user's hand upon operating the control elements 122, 124 (see FIG. 8). In the exemplary embodiment of a control panel 118 shown in the drawings, the control elements 122, 124 comprise control buttons 122 and a joystick 124. The grip rail 120 extends across the entire width of the control panel 118 and hence is designed and dimensioned to support the operation of all control elements 122, 124. The control panel 118 further comprises a display screen 126.

Figures 9A, 9B:
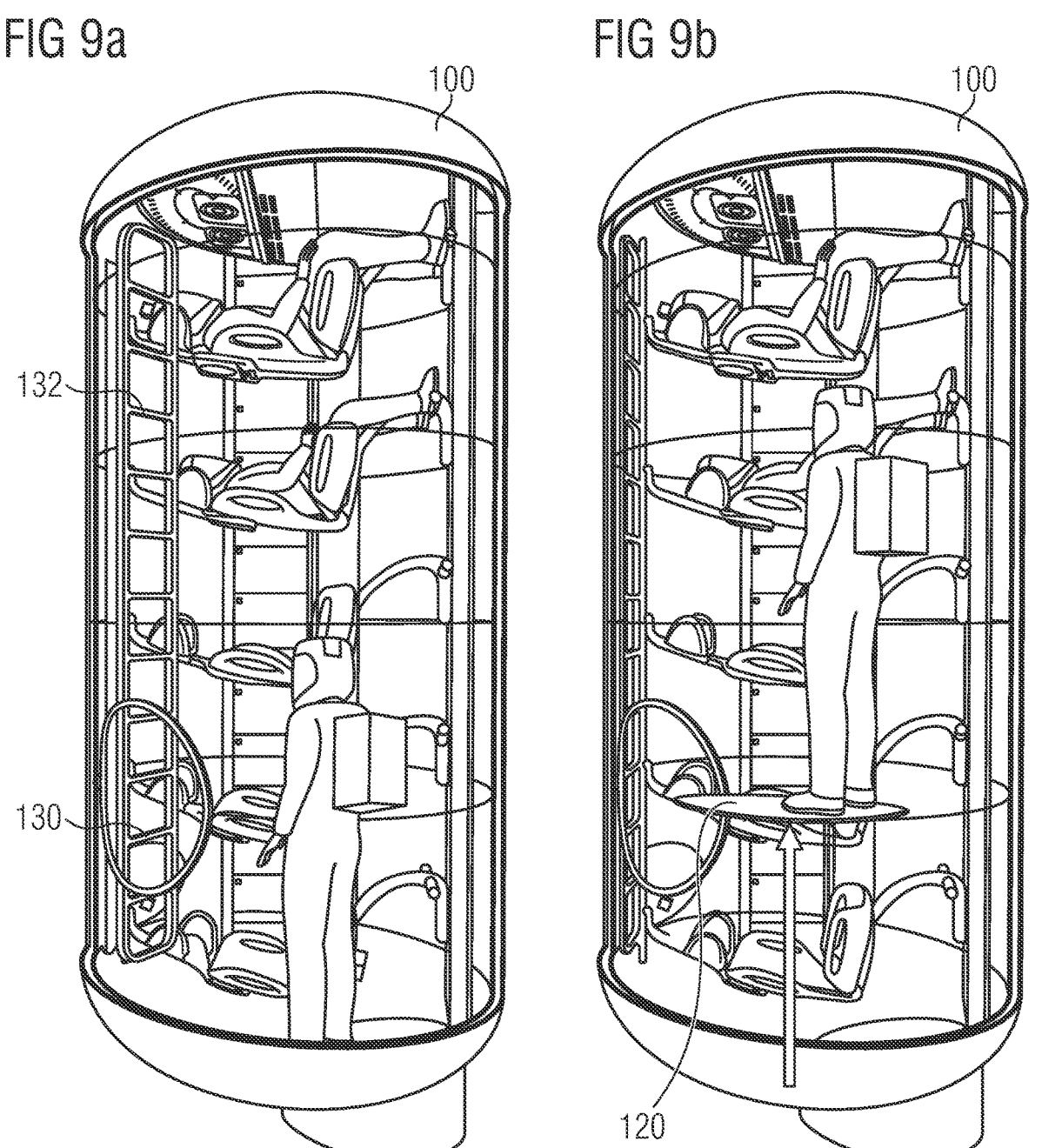
FIGS. 9a to 9b illustrate the boarding of the cabin area according to FIGS. 2a to 2d in accordance with the disclosure.

As shown in FIGS. 9a to b, which depict an exemplary process of boarding the cabin area 100 of the crew system 500 before launch of the space transport vehicle 1000, the cabin area 100 is at least temporarily equipped with a lifting platform 128 which is movable along the central longitudinal axis L of the cabin area 100 in order to lift a crew member 106, who has entered the cabin area 100 via an entrance opening 130, to a desired position within the cabin area 100. The cabin area 100 at least temporarily also comprises a ladder 132 which extends along the central longitudinal axis L of the cabin area 100. The ladder 132 allows a crew member 106 to climb to a desired position within the cabin area 100. Both, the lifting platform 128 and the ladder 130, however, are removably installed in the cabin area 100 and provided in the cabin area 100 until the end of the boarding phase only. In other words, the lifting platform 128 and the ladder 132 are removed from the cabin area 100 at the end of the boarding phase when the crew members 106 have entered the cabin area 100 in order not to occupy space and to decrease the weight of the cabin area 100 and hence the crew escape system 500.

Each of the seat systems 10 comprises a seat 12 having a backrest 14 with a supporting surface 16 which, when the seat 12 is used by a crew member 106, is suitable to support an upper body of the crew member 106. Consequently, at least during regular use of the seat 12, the orientation of the supporting surface 16 of the backrest 14 substantially defines the orientation of the crew member's 106 upper body. The backrest 14 also comprises a rear face 18 which faces away from the supporting surface 16 and which defines a backside of the backrest 14. The seat 12 further comprises a seat element 20 with a seating surface 22 which supports a buttock of a crew member 106 when using, i.e., when sitting on the seat 12 in a common manner. The seat element 20 also comprises a rear face 24 which faces away from the seating surface 22 and which defines an underside of the seat element 20.

The seat 12 is installed in a cabin area 100 of the crew escape system 500 so as to be rotatable about a first axis R1 at least between a first position depicted in FIGS. 2a to d, 7, 8 and 9a to b and a second position depicted in FIG. 3. When seat 12 is arranged in its first position, the supporting surface 16 of the backrest 14 faces a first direction D1 and the upper body of the crew member 106 sitting on the seat 12 is oriented frontally to the first direction D1.

The first direction D1 substantially corresponds to a direction of the main load M which acts on a crew member 100 using the seat 12 in a common manner during launch of a space transport vehicle 1000 comprising a crew escape system 500 equipped with the seat 12. As shown on the left side of FIG. 1, during launch, the main load direction is typically opposed to the direction of movement of the space transport vehicle 1000 and hence the crew escape system 500.

When, however, the seat 12 is arranged in its second position, the supporting surface 16 of the backrest 14 faces a second direction D2 and the upper body of the crew member 106 sitting on the seat 12 is oriented frontally to the second direction D2. The second direction D2 is opposed to the first direction D2 such that the seat 12 is rotatable about the first axis R1 between the first position and the second position by 180°. As shown on the right side of FIG. 1, the second direction D2 corresponds to a direction of the main load M which acts on a crew member 106 using the seat 12 in a common manner during a descending phase before landing of the crew escape system 500 equipped with the seat system 10 while the crew escape system 500 is still connected to the space transport vehicle 1000, once the crew escape system 500 is separated from the space transport vehicle 1000 or upon touchdown of the crew escape system 500 after a launch abort or during a nominal landing. During landing, the main load direction typically corresponds to the direction of movement of the crew escape system 500 directly before landing.

The rotation of the seat 12 at least between the first position and the second position is controlled by a control unit 25. In particular, the control unit 25 controls a rotation of the seat 12 at least between the first position and the second position in dependence on at least one signal which is indicative of a trajectory of the crew escape system 500. The control unit 25 may be a control unit which is exclusively designed to control the rotation of the seat 12. Further, an individual control unit 25 may be associated with each seat system 10 or, as shown in the drawings, a common control unit 25 may be used for controlling the rotation of the seat 12 of all seat systems 10. It is also conceivable that the control unit 25 is or constitutes a part of a superior control system of the crew escape system 500.

In the seat system 10, the control unit 25 automatically initiates a rotation of the seat 12 to adjust the position of the seat 12 in dependence on the trajectory of the crew escape system 500. This allows an automatic adjustment of the seat position, for example to a direction of the main load M acting on a crew member 106 using the seat 12 at a specific location along the trajectory.

In particular, the control unit 25 controls the rotation of the seat 12 from the first position into the second position before landing of the crew escape system 500. Thus, when the seat 12 is arranged in its first position, the orientation of the supporting surface 16 ensures that the main loads occurring during launch of the space transport vehicle 1000 act on the crew member 106 directly frontal and hence in a direction which is most tolerable for the human body. When the seat 12 is arranged in its second position, the orientation of the supporting surface 16 ensures that the main loads M occurring during landing of the crew escape system 500 again act on the crew member 106 directly frontal and hence in a direction which is most tolerable for the human body. Thus, the crew escape system 500 does not need to perform a flip maneuver for reorienting the crew escape system before landing.

The seat systems 10 shown in the drawings each comprise a drive system 26 (only schematically indicated in the drawings) which, under the control of the control unit 25, serves to rotate the seat 12 at least from the first position into the second position. It is, however, also conceivable that the seat 12, if no drive system is provided or in case of a failure of the drive system 26, is rotated from the first position into the second position in a load driven manner. In the exemplary seat systems 10 shown in the drawings, the drive system 26 is configured to rotate the seat 12 from the first position into the second position. It is, however, also conceivable to equip the seat systems 10 with a drive system 26 which is configured to move the seat 12 into any desired rotational position about the first axis R1. The drive system 26 may, for example, comprise an electric actuator. Further, for redundancy reasons, each seat system 10 may be equipped with two or more preferably identical drive systems 26 which may be operated independently from each other.

The seat systems 10 further comprise a locking system 27 (only schematically indicated in the drawings) which is configured to lock the seat 10 in at least the first position and the second position. In the exemplary seat systems 10 shown in the drawings, the locking system 27 is designed to additionally allow a locking of the seat 12 in other positions than the first position and the second position. In particular, the locking system 27 is configured to lock the seat 12 in any desired rotational position about the first axis R1.

The control unit 25 is configured to control the locking system 27 to unlock the seat 12 in dependence on at least one signal which is indicative of a trajectory of the crew escape system 500 to allow a rotation of the seat 12 from the first position into the second position. Additionally, the locking system 27 may, however, also be unlocked and locked manually. In particular, the locking system 27 may be unlocked manually, for example to rotate the seat 12 manually.

Figure 4A:
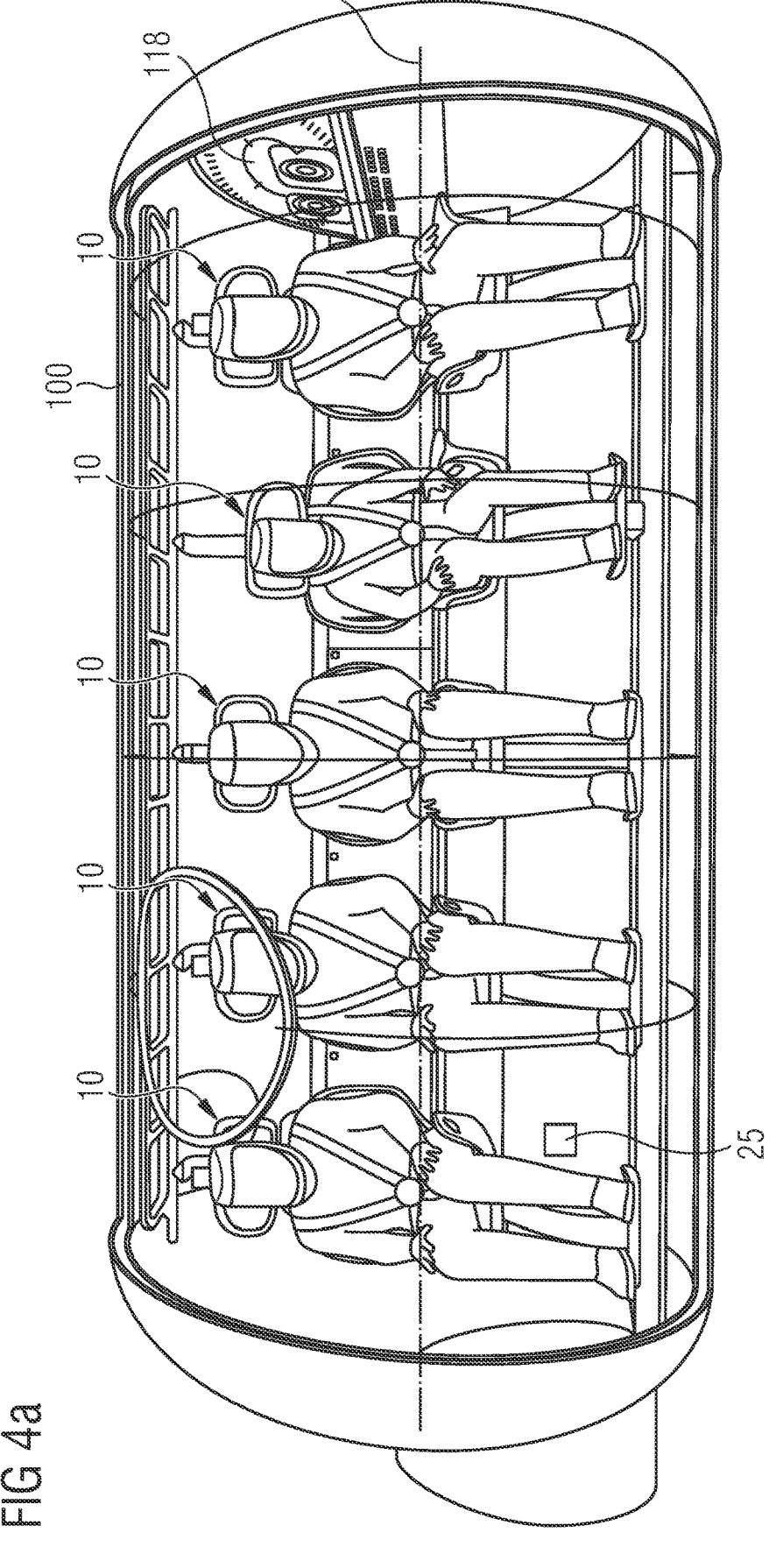
FIGS. 4a to 4b show the cabin area according to FIGS. 2a to 2d with the seats being arranged in a third position, in accordance with the disclosure.
Figure 4B:
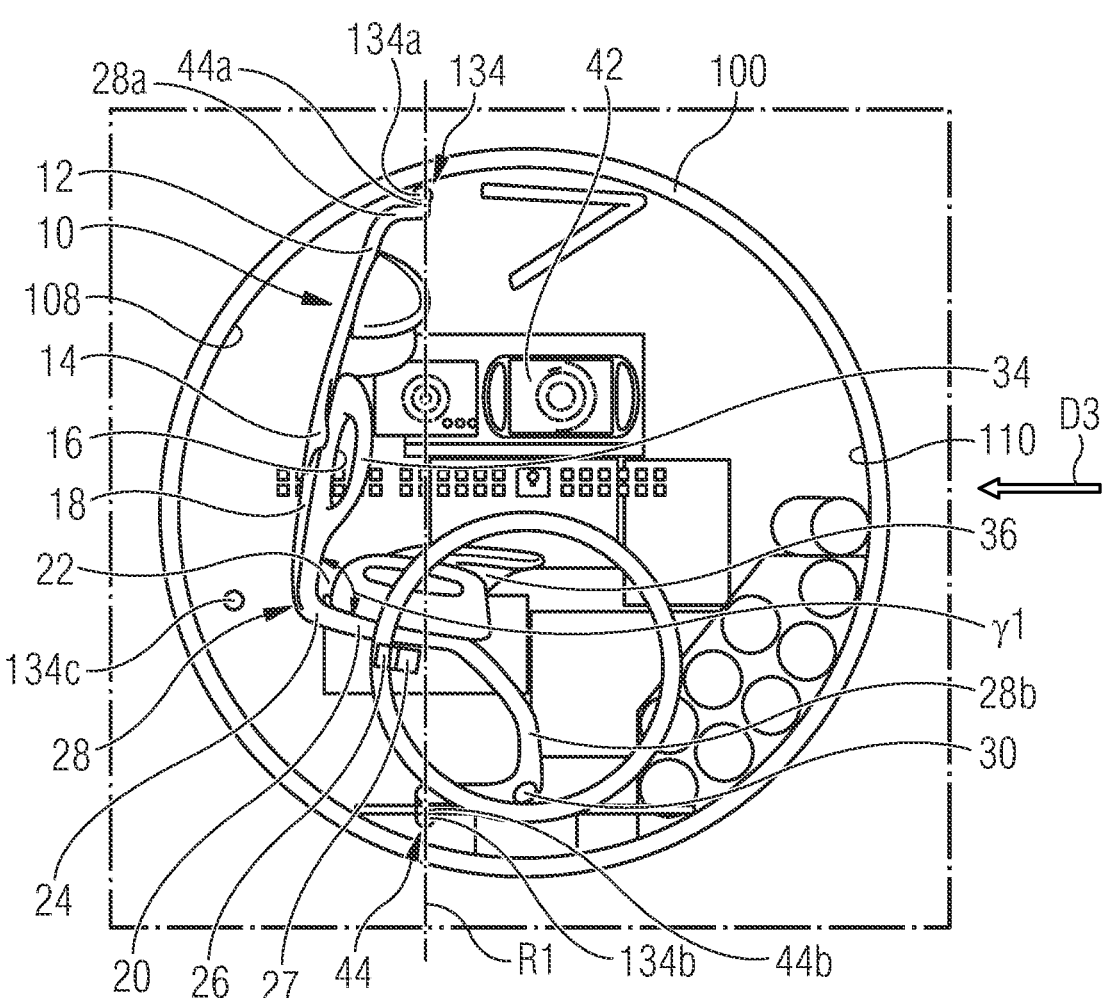
Figure 5:
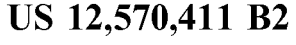
FIG. 5 shows the cabin area according to FIGS. 2a to 2d with the seats being arranged in a fourth position, in accordance with the disclosure.

Further, the locking system 27 allows that the seat 12 can, for example, be locked in a third position as shown in FIGS. 4a to b or a fourth position as shown in FIG. 5. When the seat 12 of a seat system 10 is arranged in the third position, the supporting surface 16 of the backrest 14 faces a third direction D3 which is substantially perpendicular to the first and the second direction D1, D2 and the rear face 18 of the backrest 14 is arranged adjacent to the first side wall region 105 of the cabin area 100. Although the drawings show all seats 12 arranged in the same third and fourth positions, it is also conceivable that the seats 12 are rotated and locked independent from each other to arrange the seats 12 in different positions.

Figure 6A:
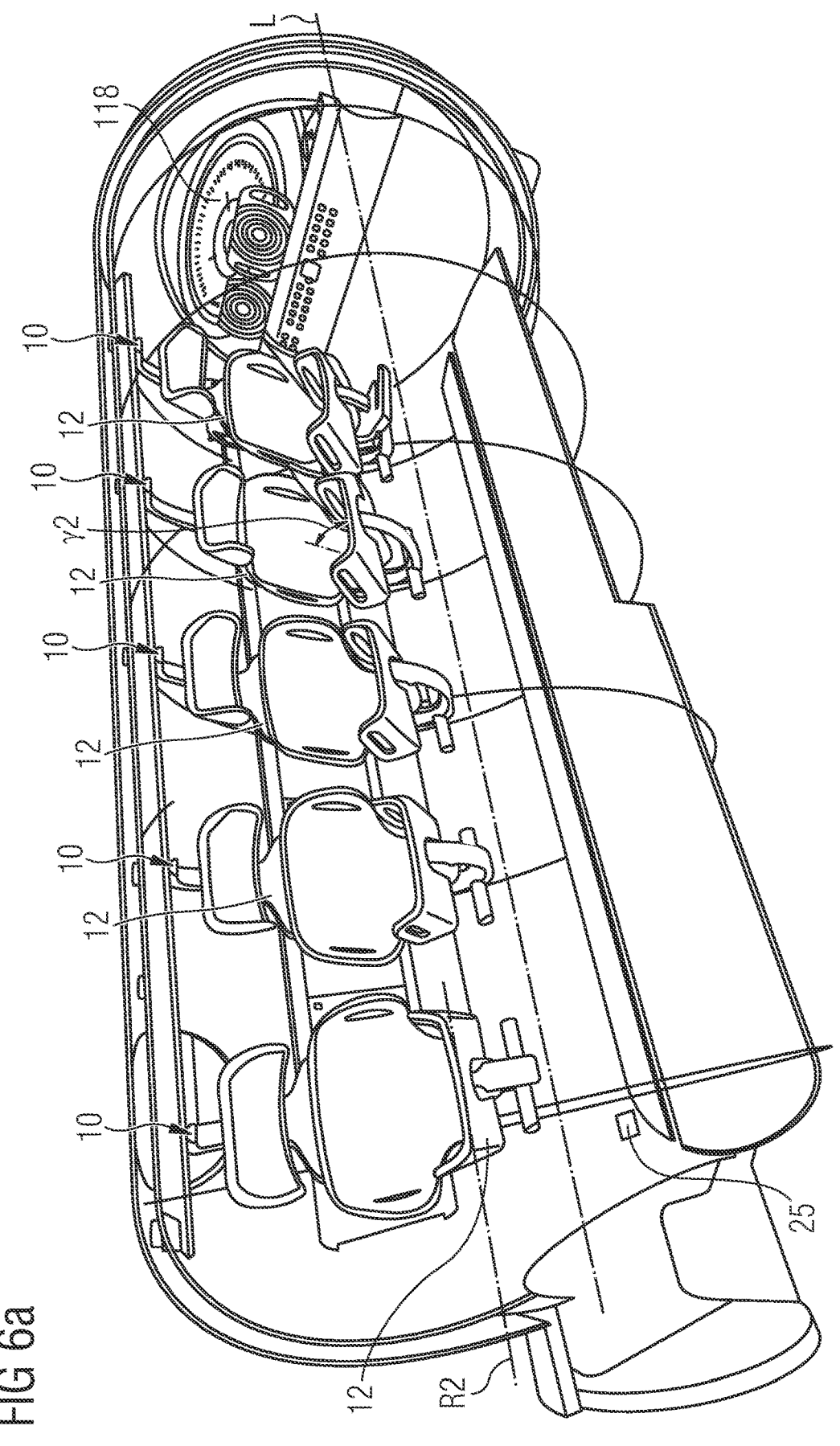
FIGS. 6a to 6b show the cabin area according to FIGS. 2a to 2d with the seats being arranged in the third position and seat elements being pivoted into a folded storage position, in accordance with the disclosure.
Figure 6B:
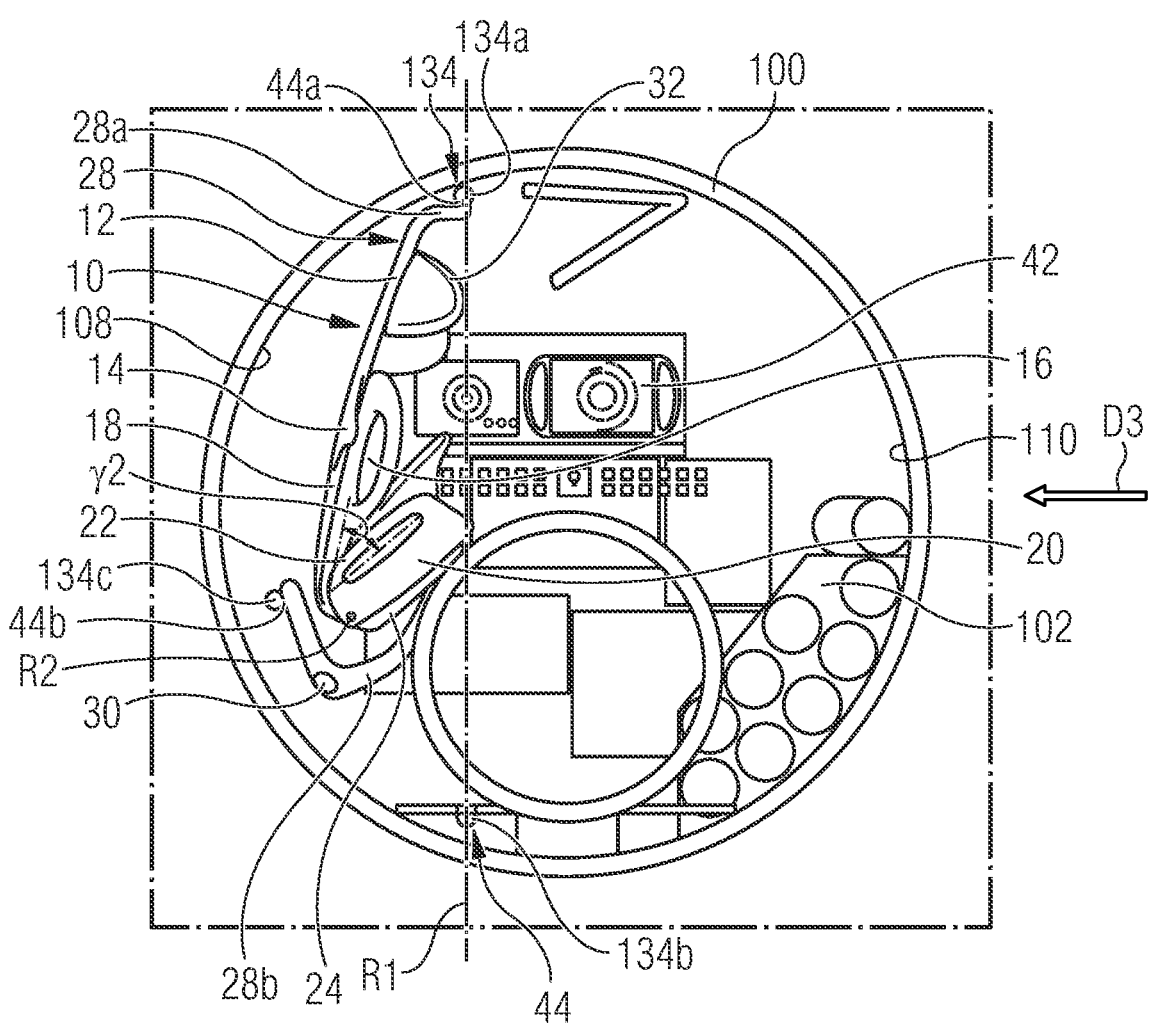

The seat element 20 of the seats 12 is pivotable relative to the backrest 14 about a second axis R2 between an unfolded use position and a folded storage position shown in FIGS. 6a to b. In the unfolded use position, the seating surface 22 of the seat element 20 and the supporting surface 16 of the backrest 14 define a first angle γ1, for example in the range of approximately 80° to 100°, preferably in the range of approximately 85° to 95° and, in particular, approximately 90°. In the folded storage position depicted in FIGS. 6a to b, the seating surface 22 of the seat element 20 and the supporting surface 16 of the backrest 14 define a second angle γ2 for example in the range of approximately 5° to 45°, preferably in the range of approximately 5° to 30°. The second angle γ2 thus is smaller than the first angle γ1. By moving the seat element 22 from its unfolded use position into its folded storage position the installation space required by the seat 12 can be significantly reduced. The thus gained free space may be used otherwise, for example as additional moving space for the crew members 106 when the seats 12 are arranged in their third position.

Each of the seats 12 further comprises a support structure 28 which provides the seat 12 with a desired structural integrity in view of the loads which are expected to act on the seat 12 during operation of the crew escape system 500. The support structure 28 is connected to at least one of the backrests 14 and the seat element 20. In exemplary seat systems 10 shown in the drawings, both the backrest 14 and the seat element 20 are attached to the support structure 28, i.e., the support structure 28 comprises a first portion 28a connected to the backrest 14 and a second portion 28b connected to the seat element 20. The second portion 28b of the support structure 28 is pivotable relative to the first portion of the support structure 28a such that the second portion 28b of the support structure can be pivoted about the second axis R2 together with the seat element 20.

Further, each seat 12 comprises a leg rest 30 which, like the backrest 14 and the seat element 20, is connected to the support structure 28, the second portion 28b of the support structure 28. The leg rest 30 is movable relative to the backrest 14 and the seat element 20 along the first axis R1 to adjust the distance between the seat element 20 and the leg rest 30 to the size of a crew member 106 using the seat 12. The seats 12 also comprise a headrest 32 connected to the support structure 28, i.e., the first portion 28a of the support structure 28. The headrest 32 is movable relative to the backrest 14 and the seat element 20 along the first axis R1 to adjust the distance between the backrest 14 and the headrest 32 to the size of a crew member 106 using the seat 12.

The seats 12 further comprise two first grip handles 34, one of which being provided on each side edge of the backrest 14, and two second grip handles 36, one of which being provided on each side edge of the seat element 20. The seat systems 10 may further comprise a tablet computer 38 which is releasably attached to the rear face 18 of the backrest 14 of the seat 12 which faces away from the supporting surface 16. Further, at least one control element 40, for example a control button, a joystick or a display screen may be provided on the rear face 24 of the backrest 14 of the seat 12. A further tablet computer 42 may be releasably attached to the control panel 118.

When the seats 12 are arranged in their first position, the supporting surfaces 16 of their backrests face the attached tablet computers 38, 42, the control element 40 and the control panel 118 so that the commander and the further crew members 106 can easily operate the attached tablet computers 38, 42, the control element 40 and the control panel 118. When, however, the seats 12 are arranged in their second position, the tablet computers 38, 42 may be released from their attachment position used to perform control or other operations.

Each seat system 10 further comprise a fixing system 44 which is configured to interact with a complementary fixation system 134 of the cabin area 100 to rotatably and releasably fix the seat 12 in an installation position in the cabin area 100. Since the fixing system 44 of the seat system 10 and the complementary fixation system 134 of the cabin area 100 are configured to releasably fix the seat 12 in the cabin area 100, the seat 12 may easily be removed from the cabin area 100 when it is not needed, either to gain free space or to arrange an item of freight in place of the seat 12. The item of freight may be provided with a fixing system that is identical to the fixing system 44 of the seat system 10 and that is configured to interact with the complementary fixation system 134 of the cabin area 100 in place of the fixing system 44 of the seat system 10 to releasably fix the item of freight in the cabin area 100.

The fixing system 44 of the seat system 10 comprises a first attachment device 44a which is connected to the first portion 28a of the support structure 28. The first attachment device 44a interacts with a complementary first fastening device 134a of the fixation system 134 of the cabin area cabin area 100 which is provided in a ceiling region of the cabin area 100, i.e., a region of the cabin area 100 which faces the upper edge of the backrest 14.

The fixing system 44 further comprises a second attachment device 44b which is connected to the second portion 28b of the support structure 28b. When the seat element 20 is arranged in its unfolded use position, the second attachment device 44b, independent of the rotational position of the seat 12 about the first axis R1, interacts with a complementary second fastening device 134b of the fixation system 134 of the cabin area 100. The second fastening device 134b is provided in a floor region of the cabin area 100, i.e., a region of the cabin area 100 which faces the rear face 24, i.e., the underside of the seat element 20.

When, however, the seat element 20 is arranged in its folded storage position, the second portion 28b of the support structure 28 has been pivoted relative to the backrest 14 and the first portion 28a of the support structure 28 together with the seat element 20 and the seat 12 is arranged in its third rotational position such that the rear face 18 of the backrest 14 is arranged adjacent to a first side wall region 108 of the cabin area cabin area 100 as shown in FIGS. 4a to b, the second attachment device 44b interacts with a complementary third fastening device 134c of the fixation system 134 of the cabin area 100. In the arrangement shown in the drawings, the third fastening device 134c is provided in the first side wall region 108. It is, however, also possible that the third fastening device 134*c* is provided at any desired region of the side wall. Further, more than one third fastening device 134*c* may be provided so that the seat 12 may be stored in different positions as desired.

In the herein described seat system, the control unit automatically initiates a rotation of the seat to adjust the position of the seat in dependence on the trajectory of the crew escape system and hence the apparent G-load factor perceived inside the crew escape system. This allows an automatic adjustment of the seat position, for example to a direction of the main load acting on a crew member using the seat at a specific location along the trajectory. In particular, the control unit may initiate an automatic rotation of the seat to ensure that the main loads act on a crew member using the seat directly frontal and hence in a direction which is most tolerable for the human body. It is, however, conceivable that the control function of the control unit is overruled by a manual operation of the seat. In particular, the seat may be configured so as be also manually rotated, for example in case of a malfunction of the control unit or in case a crew member using the seat wishes to reverse the automatic rotation initiated by the control unit.

A crew escape system equipped with the herein described seat system thus for example no longer needs to perform a flip maneuver for reorienting the crew escape system before landing. Instead, the crew escape system, along its trajectory, may follow a natural orientation given by its aerodynamic configuration. For example, the crew escape system may have a flight behavior which is comparable to the flight behavior of a shuttlecock, and which involves that a nose of the crew escape system, with respect to the direction of movement, is automatically oriented in front according to the direction of movement. Thus, an engine system for effecting the flip maneuver, for example an attitude control motor which has to be separated from the crew escape system after the flip maneuver, can be dispensed with. However, the crew escape system may be equipped with stabilizer system for stabilizing the trajectory of the crew escape system which, with respect to the direction of movement, may be arranged in a rear part of the crew escape system.

The first direction may substantially correspond to a direction of the main load which acts on a crew member using the seat in a common manner during launch of a space transport vehicle comprising a crew escape system equipped with the seat. During launch, the main load direction is typically opposed to the direction of movement of the space transport vehicle and hence the crew escape system. Thus, when the seat is arranged in its first position, the orientation of the supporting surface may ensure that the main loads occurring during launch of the space transport vehicle act on the crew member directly frontal and hence in a direction which is most tolerable for the human body.

The second direction may substantially correspond to a direction of the main load which acts on a crew member using the seat in a common manner during a descending phase before landing of a crew escape system equipped with the seat system while the crew escape system is still connected to the space transport vehicle, once the crew escape system is separated from the space transport vehicle or upon touchdown of the crew escape system after a launch abort or during a nominal landing. During landing, the main load direction typically corresponds to the direction of movement of the crew escape system directly before landing.

The control unit may be configured to control the rotation of the seat from the first position into the second position before landing of the crew escape system. When the seat is arranged in its second position, the orientation of the supporting surface ensures that the main loads occurring during landing of the crew escape system again act on the crew member directly frontal and hence in a direction which is most tolerable for the human body.

The seat system may further comprise a drive system which is configured to rotate the seat at least from the first position into the second position. It is, however, also conceivable that the seat, if no drive system is provided or in case of a failure of the drive system, is rotated from the first position into the second position in a load driven manner or manually. The manual operation is possible, because the ballistic phase (ZERO G load) typically lasts a few minutes. To simplify a load driven or manual rotation of the seat, the drive system may be dis-engageable from the seat. The drive system may be configured to rotate the seat from the first position into the second position or between the first position and the second position only. It is, however, also conceivable that the drive system is configured to move the seat into any desired rotational position about the first axis, i.e. the drive system may be configured to rotate the seat about the first axis by any desired angle between 0° and 360°. The drive system may, for example, comprise an electric motor. For redundancy reasons, the seat system may be equipped with two or more preferably identical drive systems which may be operated independently from each other. The drive system ensures proper rotation and hence proper orientation of the seat without any manual action by the crew members being necessary, at least for rotating the seat from the first position into the second position.

The control unit may be configured to initiate, by triggering an operation of the drive system, a rotation of the seat from the first position into the second position or between the first position and the second position only. The operation of the control unit and the drive system then is particularly simple and hence less prone to failure. Further, a drive system which serves to move the seat from the first position into the second position or between the first position and the second position only may have a space saving and lightweight design. The control unit and the drive system may, however, also be configured to cooperate to move the seat into any desired rotational position about the first axis, for example to move the seat in a specific position which allows the crew members to perform a specific action. In such a case, the control unit may also use other signals than a signal indicative of the trajectory of the crew escape system as a trigger signal for controlling the drive system to automatically rotate the seat. Further, it is conceivable that the drive unit, at least in certain operations situations, may be manually activated, for example by pressing a suitable activation button, to rotate the seat into a desired position.

The seat system may further comprise a locking system which is configured to lock the seat in at least the first position and the second position. The locking system may, however, also be designed to additionally allow a locking of the seat in other positions than the first position and the second position. In particular, the locking system may be configured to lock the seat in any desired rotational position about the first axis. The locking system may be provided with a suitable latching mechanism which provides for an automatic locking of the seat when the seat reaches the first position, the second position and/or any other desired rotational position about the first axis.

The control unit may be configured to control the locking system to unlock the seat in dependence on at least one signal which is indicative of a trajectory of the crew escape system. An automatic unlocking of the locking system under the control of the control unit may be accomplished by the drive system and/or an unlocking mechanism which is formed independent from the drive system. Additionally, or alternatively, the locking system may be configured to be unlocked manually.

The seat may further comprise a seat element with a seating surface. The term "seating surface" in the context of the present disclosure designates a surface of the seat element which supports a buttock of a crew member when using, i.e., when sitting on the seat in a common manner. The seat element may also comprise a rear face which faces away from the seating surface, and which defines an underside of the seat element. The seat element may be pivotable relative to the backrest about a second axis between an unfolded use position and a folded storage position.

In the unfolded use position, the seating surface of the seat element and the supporting surface of the backrest may define a first angle, whereas in the folded storage position the seating surface of the seat element and the supporting surface of the backrest may define a second angle. The second angle may be smaller than the first angle. The first angle may be in the range of approximately 80° to 100°, preferably in the range of approximately 85° to 95° and approximately 90°. The second angle may be in the range of approximately 5° to 45°, preferably in the range of approximately 5° to 30°. A further, preferably manually operable, locking system may be provided for locking the seat element in its unfolded use position and/or its folded storage position. By moving the seat element from its unfolded use position into its folded storage position the installation space required by the seat can be significantly reduced. The thus gained free space may be used otherwise, for example as additional moving space for the crew members.

A further option for gaining free space within the cabin area of the crew escape system may be a preferably manual rotation of the seat about its first axis, for example into a third position, wherein the supporting surface of the backrest faces a third direction which may be substantially perpendicular to the first and the second direction. When the seat is installed in the cabin area and arranged in the third position, the rear face of the backrest preferably is arranged adjacent to a first side wall region of the cabin area such that free space is generated between the seat and a second side wall region arranged opposite of the first side wall region.

The seat may further comprise a support structure which is configured to provide the seat with a desired structural integrity in view of the loads which are expected to act on the seat during operation of a crew escape system equipped with the seat. The support structure may be connected to at least one of the backrests and the seat element. Preferably, the backrest and the seat element are attached to the support structure. In a particular preferred embodiment, the support structure comprises a first portion connected to the backrest and a second portion connected to the seat element. The second portion of the support structure may be pivotable relative to the first portion of the support structure such that the second portion of the support structure may be pivoted about the second axis together with the seat element.

Further, the seat may comprise a leg rest. Like the backrest and the seat element, the leg rest may be connected to the support structure. Moreover, the leg rest may be movable relative to the backrest and/or the seat element along the first axis to adjust the distance between the seat element and the leg rest to the size of a crew member using the seat.

The seat may also comprise a headrest. The headrest may also be connected to the support structure. Further, the headrest may be movable relative to the backrest and/or the seat element along the first axis to adjust the distance between the backrest and the headrest to the size of a crew member using the seat.

The seat system may further comprise a fixing system. The fixing system may be configured to interact with a complementary fixation system provided in the cabin area of the crew escape system to rotatably and releasably fix the seat in an installation position in the cabin area. Since the fixing system of the seat system and the complementary fixation system of the cabin area are configured to releasably fix the seat in the cabin area, the seat may easily be removed from the cabin area when it is not needed, either to gain free space or to arrange an item of freight in place of the seat. The item of freight may be provided with a fixing system that is identical to the fixing system of the seat system and that is configured to interact with the complementary fixation system of the cabin area in place of the fixing system of the seat system to releasably fix the item of freight in the cabin area.

The fixing system of the seat system may comprise at least one attachment device configured to interact with a complementary fastening device of the fixation system of the cabin area. The at least one attachment device preferably is connected to the support structure of the seat. In a preferred embodiment, the fixing system comprises a first attachment device which may be connected to the first portion of the support structure which may extend beyond an upper edge of the backrest, i.e., an edge of the backrest which faces away from the seat element. Said first attachment device may be configured to interact with a complementary first fastening device of the fixation system of the cabin area which may be provided in a ceiling region of the cabin area, i.e., a region of the cabin area which faces the upper edge of the backrest. The first attachment device may be designed in the form of a spherical hinge allowing a particular flexible positioning/rotation of the seat.

The fixing system preferably further comprises a second attachment device which may be connected to the second portion of the support structure which may extend beyond the underside of the seat element. When the seat element is arranged in its unfolded use position, the second attachment device, independent of the rotational position of the seat about the first axis, may be configured to interact with a complementary second fastening device of the cabin area of the crew escape system which may be provided in a floor region of the cabin area, i.e. a region of the cabin area which faces the underside of the seat element. When, however, the seat element is arranged in its folded storage position, the second portion of the support structure has been pivoted relative to the backrest and the first portion of the support structure together with the seat element and the seat is arranged in its third rotational position such that the rear face of the backrest is arranged adjacent to a first side wall region of the cabin area cabin area, the second attachment device may be configured to interact with a complementary third fastening device of the fixation system of the cabin area.

The third fastening device may be provided in the first side wall region. It is, however, also conceivable that the third fastening device is provided at any desired region of the side wall to allow a particularly flexible arrangement of the seat within the cabin. Further, more than one third fastening device may be provided so that the seat may be stored in different positions as desired.

The seat system may further comprise a tablet computer which is releasably attached to the rear face of the backrest of the seat which faces away from the supporting surface. The releasable attachment of the tablet computer ensures maximum flexibility for the crew members. Further, at least one control element, for example a control button, a joystick or a display screen may be provided on the rear face of the backrest of the seat.

At least one first grip handle may be formed on a side edge of the backrest. Preferably two first grip handles are provided, one on each side edge of the backrest. Similarly, at least one second grip handle may be formed on a side edge of the seat element. Preferably two second grip handles are provided, one on each side edge of the seat element.

A cabin area for use in a crew escape system of a space transport vehicle comprises at least one above-described seat system.

Preferably, the cabin area comprises a plurality of above-described seat systems. The seat systems or only some of the seat systems may be arranged along a central longitudinal axis of the cabin area one behind another. This minimizes the frontal section of the cabin and eases the bullet shape of the crew escape system, whilst being compatible with the space requirements allowing the desired rotation of the seat. Seat systems arranged one behind another may be aligned with respect to each other in a direction along the central longitudinal axis of the cabin area. It is, however, also possible that seat systems arranged one behind another are arranged offset relative to each other in a direction along the central longitudinal axis of the cabin area.

Preferably, the at least one seat system or some or all of a plurality of seat systems is/are arranged offset relative to the central longitudinal axis of the cabin area. Such an arrangement of the seat system increases the free space lateral of the seat with respect to the central longitudinal axis of the cabin area while, at the same time, not unduly restricting the comfort of a crew member using the seat of the seat system. Additionally, the seat may be stored according to needs and storage requirements.

In a further configuration, at least one seat system, e.g., a pilot's seat system, of a plurality of seat systems may be arranged centrally with respect to the central longitudinal axis of the cabin area, whereas at least one other seat system of the plurality of seat systems may be arranged offset relative to the central longitudinal axis of the cabin area.

The cabin area preferably further comprises a fixation system which is configured to interact with the complementary fixing system of the seat system so as to releasably fix the seat in an installation position in the cabin area as described above with respect to the fixing system of the seat system. The fixation system preferably comprises a first fastening device provided in a ceiling region of the cabin area and being configured to interact with a complementary first attachment device of the fixing system of the seat system. Further, the fixation system of the cabin area may comprise a second fastening device provided in a floor region of the cabin area and being configured to interact with a complementary second attachment device of the fixing system of the seat system, when the seat element of the seat is arranged in its unfolded use position. Moreover, the fixation system of the cabin area may comprise a third fastening device provided in the cabin area and being configured to interact with the complementary second attachment device of the fixing system of the seat system, when the seat element of the seat is arranged in its folded storage position and the seat is arranged in the third position.

The third fastening device may be provided in the first side wall region. It is, however, also considerable that the third fastening device is provided at any desired region of the side wall to allow a particularly flexible arrangement of the seat within the cabin. Further, more than one third fastening device may be provided so that the seat may be stored in different positions as desired.

The cabin area may further comprise a storage module which, with respect to the central longitudinal axis of the cabin area, is arranged lateral to, i.e. beside the at least one seat system. The storage module may accommodate items of freight and/or equipment of the crew escape system such as, for example electronic components or components of other systems of the crew escape system. The storage module may provide a particularly large storage and/or installation space in case the at least one seat system is arranged offset with respect to the central longitudinal axis of the cabin area.

The cabin area may also comprise a storage space which, with respect to the central longitudinal axis of the cabin area, is arranged lateral to the at least one seat system. The storage space, for example, may be used for storing personal items of the crew members. In case the cabin area is equipped with storage module and a storage space, the storage module and the storage space preferably are arranged on opposite sides of the seat system. In particular, the storage space may be provided in the region of a side wall of the cabin area which is arranged adjacent to the seat system. Specifically, a storage space may be provided for each seat system provided in the cabin area. The storage space may be provided with at least one attachment system which is configured to interact with a complementary attachment system of a standardized piece of luggage or another personal item. For example, the attachment system of the storage space and the complementary attachment system of the standardized piece of luggage or personal item may be configured to allow an automatic latching of the standardized piece of luggage in the storage space. The standardized piece of luggage may, for example, be a backpack or a trolley.

The cabin area may further comprise a control panel. The control panel preferably is arranged in a nose region of the cabin area, which, with respect to the direction of movement, is oriented in front when the crew escape system along its trajectory follows a natural orientation given by its aerodynamic configuration. The control panel further may be arranged immediately adjacent to a seat system intended to be used by a commander, whereas the seat systems intended to be used by further crew members may be arranged at a greater distance from the control panel, i.e., when viewed along the central longitudinal axis of the cabin area, behind the seat system intended to be used by the commander. When the seat system intended to be used by the commander is arranged in its first position, the supporting surface of its backrest faces the control panel so that the commander can easily operate the control panel. When, however, the seat system intended to be used by the commander is arranged in its second position, the supporting surface of its backrest faces away from the control panel.

The control panel may be provided with a grip rail which is arranged above at least one control element of the control panel to support a user's hand upon operating the control element. The at least one control element may be a control button or a joystick. Preferably, the control panel comprises a plurality of control elements and the grip rail preferably is designed and dimensioned to support the operation of all control elements as described above.

The cabin area may also comprise a further tablet computer which is releasably attached to the control panel. For example, the further tablet computer may be released from the control panel and used to perform control operations when the seat system intended to be used by the commander is arranged in its second position and the commander faces away from the control panel.

In its tail region, the cabin area may be provided with an observation window.

Further, the cabin area may be equipped with a lifting platform which is movable along the central longitudinal axis of the cabin area to lift a crew member to a desired position within the cabin area, for example in order to allow the crew member to enter his/her seat during a launch preparation boarding phase. Preferably, however, the lifting platform is configured to be removably installed in the cabin area until the end of a boarding phase only. In other words, the lifting platform is configured to be removed from the cabin area at the end of the boarding phase when the crew members have entered the cabin area in order not to occupy space and to decrease the weight of the cabin area and hence the crew escape system.

The cabin area may also comprise a ladder which extends along the central longitudinal axis of the cabin area in order to allow a crew member to climb to a desired position within the cabin area, again for example in order to allow the crew member to enter his/her seat. Preferably, however, also the ladder is configured to be removably installed in the cabin area until the end of a boarding phase only. Thus, also the ladder may be configured to be removed from the cabin area at the end of the boarding phase when the crew members have entered the cabin area in order not to occupy space and to decrease the weight of the cabin area. It is, however, also conceivable to keep the ladder in the crew escape system and to store the ladder in a less protruding manner.

The cabin area may be substantially bullet-shaped. Further, the cabin area may have a substantially constant, for example, circular cross-section along at least 80% of its extension along its central longitudinal axis.

A method of operating a seat system for use in a crew escape system of a space transport vehicle may comprise a step of providing a seat having a backrest with a supporting surface which, when the seat is used by a crew member, is suitable to support an upper body of the crew member, and being configured to be installed in a cabin area of the crew escape system so as to be rotatable about a first axis at least between a first position, wherein the supporting surface of the backrest faces a first direction, and a second position, wherein the supporting surface of the backrest faces a second direction, the second direction being opposed to the first direction. A rotation of the seat at least between the first position and the second position is controlled by a control unit in dependence on at least one signal which is indicative of a trajectory of the crew escape system.

The first direction may correspond to a direction of a main load which acts on a crew member using the seat during launch of the space transport vehicle. The second direction may correspond to a direction of a main load which acts on a crew member using the seat during a descending phase before landing of a crew escape system equipped with the seat system while the crew escape system is still connected to the space transport vehicle, once the crew escape system is separated from the space transport vehicle or upon touchdown of the crew escape system after a launch abort or during a nominal landing. The control unit may control the rotation of the seat from the first position into the second position before landing of the crew escape system.

The seat may be rotated at least from the first position into the second position under the control of the control unit, in particular by means of a drive system. Alternatively, or additionally, the seat may be manually rotated into the first position, the second position or another position which is different from the first position and the second position. Alternatively, or additionally, the seat may be locked in at least the first position and the second position and preferably also in another position which is different from the first position and the second position.

A seat element of the seat may be, in particular manually, pivoted relative to the backrest about a second axis between an unfolded use position, wherein a seating surface of the seat element and the supporting surface of the backrest define a first angle, and a folded storage position, wherein the seating surface of the seat element and the supporting surface of the backrest define a second angle which is smaller than the first angle. The seat may be, preferably manually, rotated about the first axis into a third position, wherein the supporting surface of the backrest faces a third direction substantially perpendicular to the first direction and the second direction.

A third fastening device of a fixation system of the cabin area, which is provided in the cabin area may be engaged with a complementary second attachment device of a fixing system of the seat system, when the seat element of the seat is arranged in its folded storage position and the seat is arranged in the third position.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cabin area for use in a crew escape system of a space transport vehicle, the cabin area comprising at least one seat system, the seat system comprising:

a seat having a backrest with a supporting surface which, when the seat is used by a crew member, is suitable to support an upper body of the crew member, and being configured to be installed in a cabin area of the crew escape system so as to be rotatable about a first axis at least between a first position, wherein the supporting surface of the backrest faces a first direction, and a second position, wherein the supporting surface of the backrest faces a second direction, the second direction being opposed to the first direction;

a control unit configured to control a rotation of the seat at least between the first position and the second position in dependence on at least one signal that is indicative of a trajectory of the crew escape system; and a fixing system configured to interact with a complimentary fixation system provided in a cabin area of the crew escape system so as to releasably fix the seat in an installation position in the cabin area, wherein the fixation system comprises at least one of:

a first fastening device provided in a ceiling region of the cabin area and being configured to interact with a complementary first attachment device of the fixing system of the seat system;

a second fastening device provided in a floor region of the cabin area and being configured to interact with a complementary second attachment device of the fixing system of the seat system, when the seat element of the seat is arranged in its unfolded use position; and a third fastening device provided in the cabin area and being configured to interact with the complementary second attachment device of the fixing system of the seat system, when the seat element of the seat is arranged in its folded storage position and the seat is arranged in the third position; and/or at least one of:

a storage module which, with respect to a central longitudinal axis of the cabin area, is arranged lateral to the at least one seat system;

a storage space which, with respect to the central longitudinal axis of the cabin area, is arranged lateral to the at least one seat system, wherein the storage space is provided with at least one attachment system configured to interact with a complementary attachment system of a standardized piece of luggage or another personal item;

a control panel which is arranged in a nose region of the cabin area and faces an interior of the cabin area, the control panel being provided with a grip rail which is arranged above at least one control element of the control panel to support a user's hand upon operating the control element;

a further tablet computer which is releasably attached to the control panel;

an observation window which is arranged in a tail region of the cabin area;

a lifting platform which is movable along the central longitudinal axis of the cabin area to lift a crew member to a desired position within the cabin area, wherein the lifting platform is configured to be removably installed in the cabin area until the end of a boarding phase only; and a ladder which extends along the central longitudinal axis of the cabin area to allow a crew member to climb to a desired position within the cabin area, wherein the ladder is configured to be removably installed in the cabin area until the end of a boarding phase.

2. The cabin area according to claim 1, further comprising a plurality of seat systems, wherein at least some of the seat systems, in a direction parallel to the central longitudinal axis of the cabin area, are arranged one behind another.

3. The cabin area according to claim 2, wherein the at least one seat system is arranged offset relative to the central longitudinal axis of the cabin area.

4. The cabin area of claim 2, wherein the at least one seat system is arranged centrally with respect to the central longitudinal axis of the cabin area, and wherein at least one other seat system of the plurality of seat systems is arranged offset relative to the central longitudinal axis of the cabin area.

5. The cabin area according to claim 1, wherein a contour of the cabin area is bullet-shaped and/or has a constant cross-section along at least 80% of its extension along its central longitudinal axis.

6. A method of operating a seat system for use in a crew escape system of a space transport vehicle, the method comprising:

providing a seat having a backrest with a supporting surface which, when the seat is used by a crew member, is suitable to support an upper body of the crew member, and being configured to be installed in a cabin area of the crew escape system so as to be rotatable about a first axis at least between a first position, wherein the supporting surface of the backrest faces a first direction, and a second position, wherein the supporting surface of the backrest faces a second direction, the second direction being opposed to the first direction; and controlling a rotation of the seat at least between the first position and the second position by a control unit in dependence on at least one signal which is indicative of a trajectory of the crew escape system, wherein:

the first direction corresponds to a direction of a main load which acts on a crew member using the seat during launch of the space transport vehicle, the second direction corresponds to a direction of a main load which acts on a crew member using the seat during a descending phase before landing of a the crew escape system equipped with the seat system while the crew escape system is still connected to the space transport vehicle, once the crew escape system is separated from the space transport vehicle or upon touchdown of the crew escape system after a launch abort or during a nominal landing, and the control unit controls the rotation of the seat from the first position into the second position before landing of the crew escape system; and wherein:

the seat is rotated at least from the first position into the second position under the control of the control unit, in particular by means of a drive system; and/or the seat is manually rotated into the first position, the second position or another position which is different from the first position and the second position; and/or the seat is locked in at least the first position and the second position and also in another position which is different from the first position and the second position; and/or wherein a seat element of the seat is, in particular manually, pivoted relative to the backrest about a second axis between an unfolded use position, wherein a seating surface of the seat element and the supporting surface of the backrest define a first angle, and a folded storage position, wherein the seating surface of the seat element and the supporting surface of the backrest define a second angle which is smaller than the first angle; and/or the seat is manually rotated about the first axis into a third position, wherein the supporting surface of the backrest faces a third direction substantially perpendicular to the first direction and the second direction; and/or engaging a third fastening device of a fixation system of the cabin area, which is provided in the cabin area with a complementary second attachment device of a fixing system of the seat system, when the seat element of the seat is arranged in its folded storage position and the seat is arranged in the third position.

\*   \*   \*   \*   \*